United States Patent [19]

Gillet et al.

[11] Patent Number: 4,794,457
[45] Date of Patent: Dec. 27, 1988

[54] VIDEO SIGNAL MIXER CIRCUIT FOR HIGH-RESOLUTION IMAGING WITH SOLID-STATE MATRIX SENSOR CAMERAS

[75] Inventors: Claude Gillet, Montreuil; Gérard Voisin, Trappes; Jean-François Bruyeres-Inza, Orgeval, all of France

[73] Assignee: Thomson-CSF, Paris, France

[21] Appl. No.: 113,157

[22] Filed: Oct. 27, 1987

[30] Foreign Application Priority Data

Oct. 31, 1986 [FR] France ................ 86 15237

[51] Int. Cl.$^4$ .......................................... H04N 5/208
[52] U.S. Cl. ............................ 358/162; 358/213.28; 358/166
[58] Field of Search ............... 358/223.28, 213.27, 358/213.13, 212, 213.26, 162, 166; 250/578

[56] References Cited

U.S. PATENT DOCUMENTS

| 4,220,977 | 9/1980 | Yamanaka | 358/213.26 |
| 4,272,684 | 6/1981 | Seachman | 358/212 |
| 4,334,238 | 6/1982 | Morishita et al. | 358/43 |
| 4,475,125 | 10/1984 | Esser et al. | 358/162 |
| 4,595,954 | 6/1986 | Endo et al. | 358/213.28 |
| 4,652,928 | 3/1987 | Endo et al. | 358/213.28 |
| 4,731,665 | 3/1988 | Hashimoto et al. | 358/213.28 |

FOREIGN PATENT DOCUMENTS

| 0103488 | 3/1984 | European Pat. Off. . |
| 0178938 | 4/1986 | European Pat. Off. . |
| 0015376 | 1/1984 | Japan | 358/213.28 |

OTHER PUBLICATIONS

Patent Abstracts of Japan, vol. 6, No. 111, (E-114) (989), Jun. 22, 1982; JP-A-57 39 673 (Minolta Camera K.K.), 04-03-1982.

Primary Examiner—Jin F. Ng
Assistant Examiner—Stephen Brinich
Attorney, Agent, or Firm—Cushman, Darby & Cushman

[57] ABSTRACT

The circuit disclosed can be used to process synchronous video signals, especially those coming from two standard CCD sensors. It comprises two channels connected at the output to the two inputs, respectively, of an adder circuit which gives the mixed video signal. The first channel comprises a subtractor circuit which receives the two video signals, a high-frequency filter circuit to eliminate the low-frequency spectrum ranging between 0 and a determined limit frequency, an amplifier circuit to balance the gain of the two channels and a fast change-over/sampler circuit connected to the first input of the adder during half of each dot cycle, while the second input of the adder continually receives one of the video signals. The mixed signal thus comprises an unchanged low-frequency component which eliminates faults in the sensors related to non-homogeneity. The high-frequency component recovered corresponds to the first signal during the first half of the dot cycle and to the second signal during the second half of the dot cycle.

7 Claims, 3 Drawing Sheets

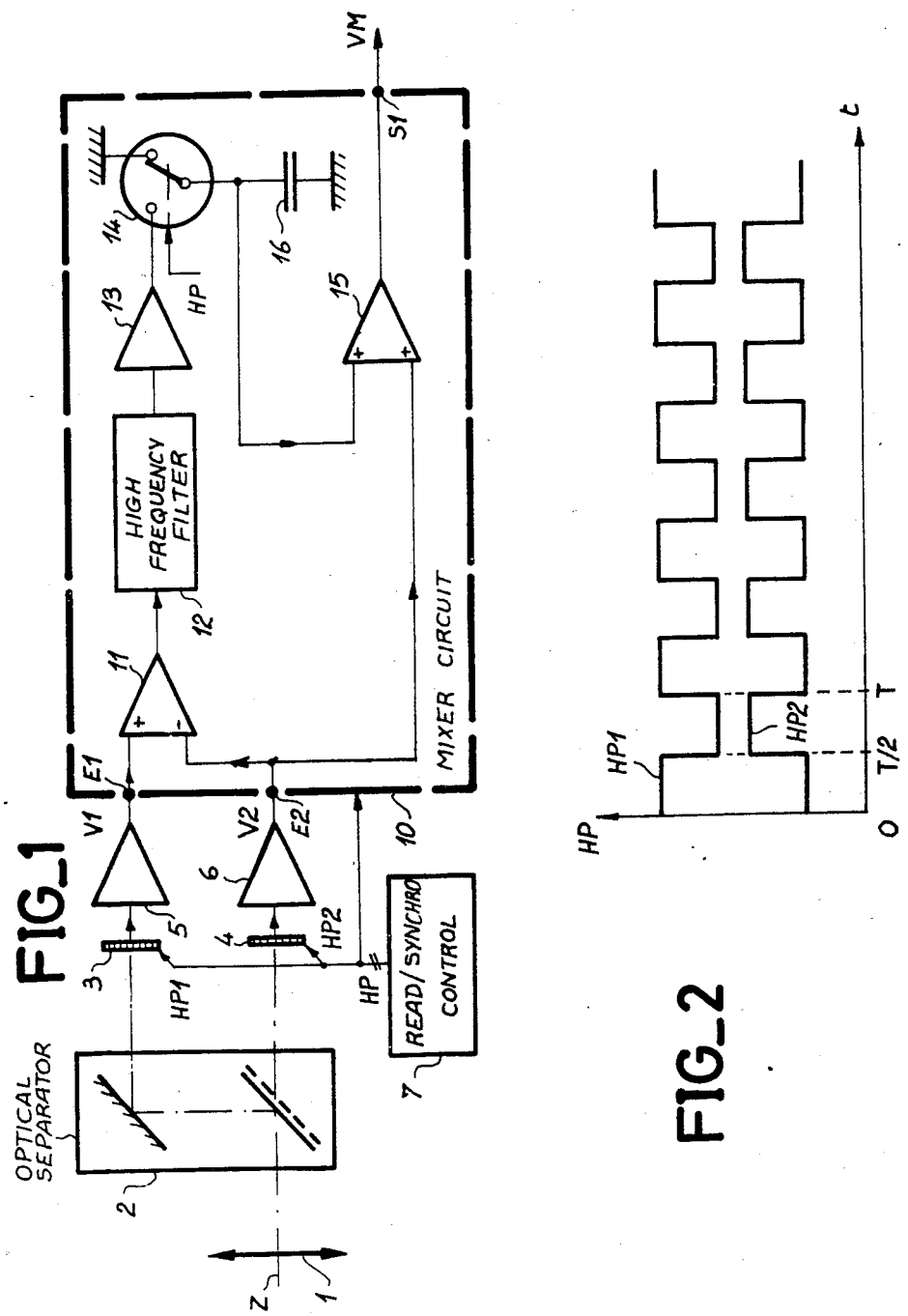

FIG_3
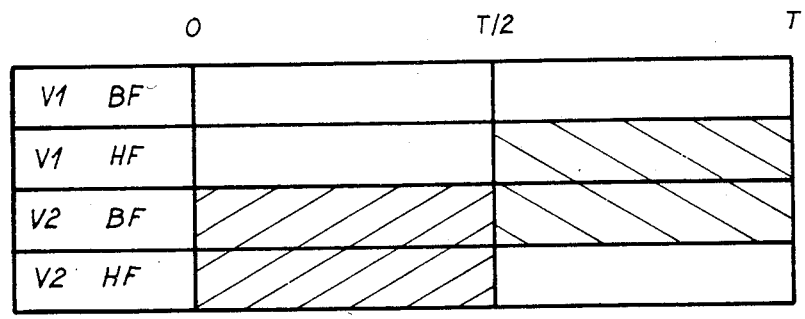
FIG_4
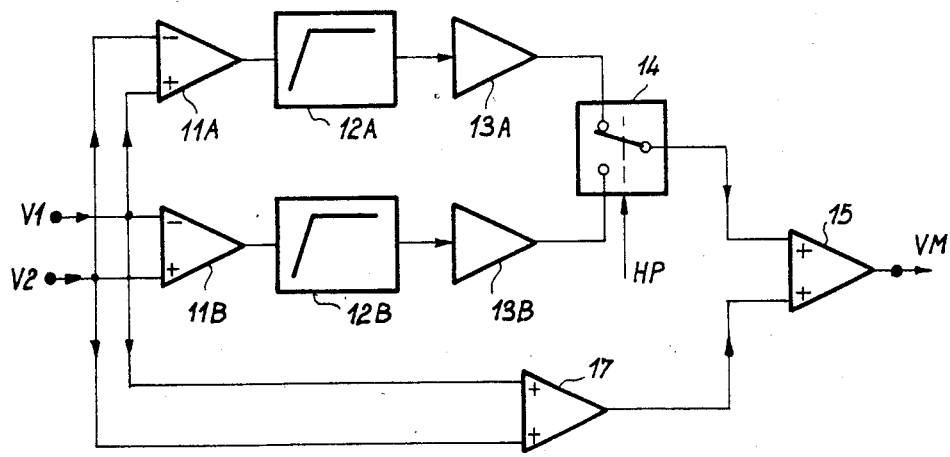
FIG_5
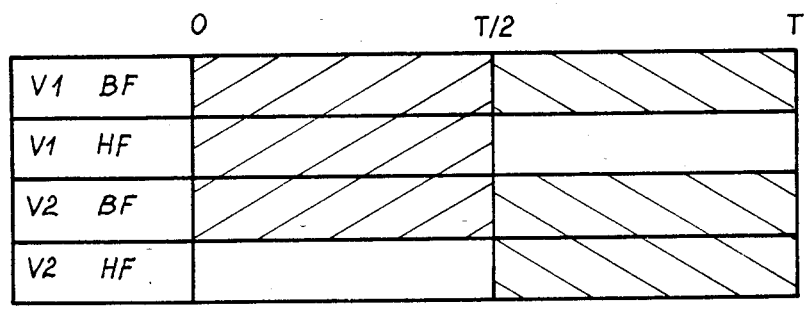

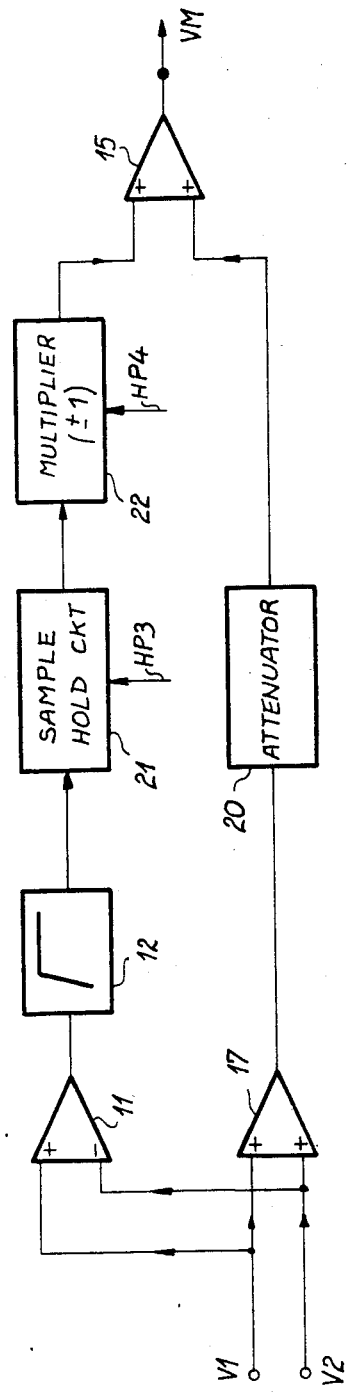
FIG_6
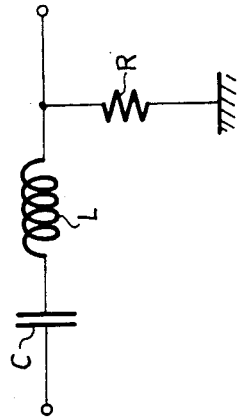
FIG_8
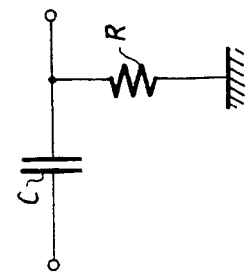
FIG_7

VIDEO SIGNAL MIXER CIRCUIT FOR HIGH-RESOLUTION IMAGING WITH SOLID-STATE MATRIX SENSOR CAMERAS

BACKGROUND OF THE PRESENT INVENTION

1. Field of the Present Invention

The present invention pertains to a video signal mixer circuit which can be more especially applied to the obtaining of high-resolution images with television cameras having solid-state circuit matrix sensors known as CCDs (Charge Coupled Devices).

2. Description of the Prior Art

CCD sensors incorporate, on one and the same silicon surface, a matrix of sensitive dots and the device for the serial reading of all these sensitive dots used to form a video signal. There are two main types of architecture: frame transfer devices and line transfer devices.

By nature and construction, solid-state sensors have many advantages as compared with silicon tubes. These advantages relate chiefly to their compactness and to the small voltages used. They are also noteworthy for their high resistance to shocks and vibration, the possibility of being cooled in a simplifed way, their longer lifetimes, easy maintenance, etc.

Prior art methods for heightening the resolution of CCD cameras include fitting them with two interline transfer type sensors having a great number of cells per line (up to 500 dots per line). These cells are not joined to each other. The sensitive zone and the memory zone are interlaced with each other and not on top of each other as in the so-called frame transfer type of organization.

The memory zone of these matrices is organized in a series of vertical registers interposed between the columns of sensitive cells. These vertical registers constitute blind zones of a width comparable with that of the columns of sensitive dots. It is therefore possible to associate two sensors of this type optically in displacing them by half a pitch along the line horizontally and by superimposing them vertically in order to double the horizontal resolution.

The optical assembly is done on a separating prism placed between the lens and the CCD sensors. The prism has a flat semi-transparent surface which divides the beam into two so that the sensor "sees" the same image. The two CCD sensors are positioned precisely with respect to each other, and are offset by half a pitch as stated above.

For the reading of the sensors, it is possible to use two clock signals at the dot frequency, one of these signals being shifted by half a cycle with respect to the other to correspond to the spatial offset between the matrices along the horizontal lines. After processing by alignment with the black level and automatic gain control, the video signals of the two sensors can be multiplexed at the dot rate to select the alternating dots of each sensor.

This simple technique has many disadvantages, resulting essentially from the non-homogeneity of the two sensors. For, during the manufacturing process, the doping of silicon is not homogeneous both inside the strip and on each slice cut out of the strip where the said doping varies from the center to the edge and from one slice to another. Consequently, the diodes formed on the matrix have differing detection sensitivities and small variations between one another. The two sensors therefore have different detecting levels for the same lighting conditions. Furthermore, changes according to temperature result in a black-reducing leakage current which will also differ. The architectural aspect has little effect on the variations except when the components involved come from different manufacturers.

It is therefore, necessary to compensate for the differences between the sensors, but differences in sensitivity cannot easily be compensated for by electronic techniques. To obtain a good-quality image, the level of the video signal given by the two sensors would have to be servo-controlled with a precision of about 1%, and there would have to be identical levels of black when the temperature varies, and it would be necessary to select sensors with sensitivities which are substantially identical and homogeneous on their surface.

There is no immediate method to cope with all these constraints when using the equipment, and they have not been coped with at the level of the manufacturer.

An object of the invention is to propose a video mixer which will remove these disadvantages by using standard sensors. It is known, especially with contour-correction techniques or with high-definition television images, that the video data can be separated into two parts, a first part corresponding to a low frequency spectrum between 0 and about 500 Khz (this latter value is given as an indication and it is possible to choose a limit which is quite far from this value) and a high-frequency spectrum located above the low-frequency limit selected. The low-frequency information is the part sensitive to the flaw represented by non-homogeneity. It corresponds, in the image, to broad zones of dark or bright colors. This low-frequency information does not relate to the details and fineness, and therefore excludes sudden variations, especially the contours. With this spectrum, the smallest dot is represented by a zone corresponding to about 3% to 4% of the width of the screen. The high-frequency information, on the contrary, corresponds to the sharpness of the image at the straight edges and, therefore, to the contours and to sudden variations. This high-frequency value is limited to about 7 to 8 MgHz for presently used sensors.

SUMMARY OF THE INVENTION

According to the invention, it is proposed to make a video mixer circuit receiving a first video signal and a second video signal, the latter signal corresponding substantially to the first signal displaced by half a dot in the line-scanning direction, the mixer comprising a change-over/sampler circuit to multiplex the video signals by successively sampling one signal and then the other at the scanning dot rate, the said circuit comprising at least two channels respectively connected to the two inputs of an adder circuit, a first channel comprising the following series-connected elements: a subtractor circuit which receives the first signal and the second signal, a high-frequency filter circuit to eliminate the low-frequency spectrum ranging between 0 and a pre-determined frequency of the difference of the video signals, and the said sampler connected by its output to a first output of the said adder circuit, the second channel transmitting at least one of the signals to the second input of the said adder, so that the mixed signal delivered at the output comprises a high-frequency part corresponding to the first signal during each half cycle and to the second signal during each second half of this cycle and a low-frequency part which is unchanged.

BRIEF DESCRIPTION OF THE DRAWINGS

The specific features and advantages of the invention will be seen from the following description, which is given by way of example and is made with reference to the appended figures, of which:

FIG. 1 is a diagram of a first embodiment of a video mixer circuit according to the invention considered in the context of a high-definition imaging application with a CCD sensor camera;

FIG. 2 shows wave forms pertaining to the synchronizing signals for the reading of the sensors;

FIG. 3 is a table representing the low-frequency video signals and high-frequency video signals sampled during each half cycle;

FIG. 4 is a diagram of a second embodiment of a mixer circuit according to the invention;

FIG. 5 is a table corresponding to the low-frequency and high-frequency video signals sampled in the method of FIG. 4 during each half cycle;

FIG. 6 is a diagram of a third alternative embodiment of a mixer circuit according to the invention;

FIGS. 7 and 8 are two possible embodiments of the high-frequency filtering system used, with a low-pass filter or a pass-band filter respectively.

DESCRIPTION OF THE PREFERRED EMBODIMENTS

The mixer circuit 10 is used in the embodiment of FIG. 1 to process the video signals V1 and V2 prepared by a television camera with two CCD sensors arranged to produce a high-resolution image. The main elements shown comprise the lens 1 with an optical axis Z, followed by an optical separator 2 which separates the light flux into two optical channels respectively designed for the two solid-state matrix sensors 3 and 4. These sensors are preferably of the interline type and are positioned in relation to each other as indicated above. The signals detected are applied to amplifying and processing circuits 5 and 6. The circuit 7 represents the read and synchronization control at the dot rate. HP designates the dot frequency clock signals. These signals are shown in detail in FIG. 2, where HP1 designates the clock signal applied to one of the sensors 3 and HP2 designates the signal, shifted by a half cycle, applied to the other sensor 4. Any one of these signals can be used to control the mixer 10.

The mixer 10 has two channels. A first channel groups the following series-connected elements: a differential amplifier circuit or subtractor 11, a high-frequency filter 12, a compensating amplifier 13 and a sample/hold circuit 14. The output of the sampler constitutes the output of this first channel, and is applied to a first input of an adder circuit 15 which receives, through its second input, the second channel comprising one of the video signals V2 in the assembly shown. The output of the adder VM represents the mixed video signal.

The subtractor circuit 11 is connected to the two inputs E1 and E2 of the mixer 10 from which it respectively receives the signals V1 and V2. It delivers the difference V1−V2 of these signals. The effect of the high-frequency filter circuit 12 is to eliminate the low-frequency components of the difference V1−V2 in a spectral band ranging between zero and a pre-determined frequency, for example, about 500 KHz. The signal output from the filter 12 therefore comprises high-frequency components above this limit value and is called (V2−V1) HF. The amplifier 13 may have an adjustable gain to balance the two channels. The change-over/sampler circuit 14 is controlled at the dot rate by a clock signal HP coming from the circuit 7. Its function is to disconnect the first channel during the first half of each dot cycle T and to connect this channel to the adder 15 during each second half of the dot cycle, namely T/2 to T. Since the first channel is disconnected from 0 to T/2, this circuit may comprise, at its output, a holding capacitor 16 which is reset during each first half cycle from 0 to T/2 by the connection of the change-over switch 14 with the ground level reference.

The second channel comprises the connection between the second input E2 and the second input of the adder 15 to which it continually transmits the video signal V2. This video signal V2 is transmitted in a full band, i.e. both its low-frequency spectrum V2BF (BF=low frequency) and its high-frequency spectrum V2HF (HF=high frequency), considering the BF and HF spectra defined by the filter 12. The table of FIG. 3 shows the signals which are transmitted through the adder 15 and which constitute the mixed video signal VM. It is realized during the first half cycle, 0 to T/2, that the output VM consists of the sum (V2BF+V2HF), namely the totality of the signal V2. During the second cycle, T/2 to T, the signal VM is formed of the part V2BF and the part V1HF coming from the first channel. This signal substantially corresponds to the signal V1, given the very small horizontal shift, between the matrices, equal to half the pitch of the pixels, in view of the fact that the image practically does not vary at low-frequency on a range of this size. By contrast, since the low-frequency signal is the same during each half cycle and since it comes from the same sensor (in this case the sensor 4) the said low-frequency signal is not subjected to the differences of homogeneity which may exist between the sensors 3 and 4, and the faults and disadvantages that result from this absence of homogeneity are eliminated.

FIG. 4 pertains to another embodiment of the mixer wherein the first channel is sub-divided into two parallel channels up to the level of the change-over/sampler circuit 14. Each of these channels have the same series-connected elements as above, namely a subtractor circuit, respectively 11A and 11B, a high-frequency filter, respectively 12A and 12B, and a gain-compensating circuit, 13A and 13B. The subtractors 11A and 11B receive the signals V1 and V2 so as to give the difference (V1−V2) for one of these channels and the difference (V2−V1) for the other channel. The fast change-over switch 14 alternately connects either output of these channels, for example, on the side 13A from 0 to T/2 of each dot cycle and on the side 13B from T/2 to T. Thus, the adder 15 receives, at its first input, the signal (V1−V2) HF during the first half of the dot cycle, and the signal (V2−V1) HF during the second half of this cycle. The video channel, which ends at the second input of the adder 15, comprises an adder circuit 17 also fed with the two signals V1 and V2 to obtain the sum (V1+V2) without any spectral restriction. Consequently, the output of the adder 15 comprises, as summarized in the table of FIG. 5, during the first half cycle 0 to T/2 of each dot cycle, all the low-frequency signals V1 and V2 and the high-frequency signal V1 with a gain coefficient equal to 2, namely (V1+V2)BF+2V1HF. The signal VM comprises, during the second half of each dot cycle from T/2 to T, the same low-frequency component and the high-frequency part relating to V2, namely (V1+V2) BF+2V2HF. Here again, it is seen that the low-frequency VM signal is unchanged. The said signal corresponds this time to the sum of the signals V1 and V2 of the two sensors during the two half cycles of each dot cycle. As a result of this, the non-homogeneity faults of the sensors are also eliminated. Furthermore, with this assembly, the high-frequency part is obtained with a gain equal to 2.

The elements 13 of FIG. 1 and 13A, 13B of FIG. 4 may consist of adjustable-gain amplifiers to balance the gains of the different channels. Similarly, as shown in the assembly of FIG. 6, it is possible to use an attenuator 20 on the lower channel feeding the second input of the adder 15, instead of an amplifier 13 on the upper channel or channels.

The assembly of FIG. 6 is equivalent to the one of FIG. 4, but requires fewer circuits. It has two channels, the lower channel with the adder 17 and an attenuator 20, the two upper channels are replaced by a single channel with the elements 11, 12 already referred to, and the fast change-over switch 14 is replaced by a sampe/hold circuit 21 followed by a multiplier circuit 22. The circuit 22 produces a multiplication by +1 or −1. It is set to perform multiplication by −1 during each first half of a dot cycle, namely between the instants nT and $(n+\frac{1}{2})T$, and by the coefficient +1 during each second half of a dot cycle, i.e. between the instants $(n+\frac{1}{2})T$ and $(n+1)T$, the value n being equal to 0 or to a whole number greater than 0. The circuits 21 and 22 are controlled by corresponding synchronization signals, marked HP3 and HP4, coming from the generator 7. As previously, the circuit delivers the signal (V1+V2) BF+2V1HF during the first half of a dot cycle and the signal (V1+V2)BF+2V2HF during the second half of a dot cycle.

The high-frequency filter circuit 12 may be a high-pass filter made simply with an RC cell of the type shown in FIG. 7. With an RLC cell of the type shown in FIG. 8, the function provided is a pass-band filtering function which limits the filtering to above a determined HF frequency chosen in relation with the Nyquist frequency presented by the system. This limit frequency may be around 10 MgHz with interline transfer sensors having 500 dots per line to display a high-resolution image with 625 lines of 1000 dots.

The mixing circuits described according to the invention enable the multiplexing of synchronous video signals and can also be used for contour correctors, the adjusting being obtained by means of a gain control. In this use, an initial video channel will be split up to form two synchronous channels, using an electrical delay circuit making it possible to time-shift the signal by a value corresponding to half a pixel.

What is claimed is:

1. A video mixer circuit receiving a first video signal and a second video signal, the latter signal corresponding to the first signal displaced by half a dot in the line-scanning direction, the said mixer circuit comprising: an adder circuit; a first channel comprising the following series-connected elements: a subtractor circuit which receives the first video signal and the second video signal, a high-frequency filter circuit to eliminate the low-frequency spectrum ranging between 0 and a pre-determined frequency and a change-over/sampler circuit to connect, by its output, the first channel to a first input of the said adder circuit, the second channel transmitting at least one of the video signals to a second input of the said adder circuit, so that the signal delivered at the output of the adder circuit spectrally comprises a high-frequency part corresponding to one of the video signals during the first half of each dot cycle and to the other video signal during the second half of each dot cycle and a low-frequency part corresponding to at least one of the said video signals.

2. A mixing circuit according to the claim 1 wherein the said change-over/sampler circuit connects the first input of the said adder circuit to the said first channel during half of each dot cycle and to the ground during the other half.

3. A mixing circuit according to the claim 1 wherein the first channel is sub-divided into two parallel sub-channels, up to the level of the change-over/sampler circuit, each of these parallel sub-channels comprising the following elements connected in series: a subtractor circuit followed by a high-frequency filter circuit, the said change-over switch alternately connecting the output of each of these parallel sub-channels to the first input of the adder circuit, the said second channel also comprising an adder circuit fed with the two video signals to produce the corresponding sum.

4. A mixing circuit according to the claim 1 wherein an amplifier circuit is interposed between the filter output and the said change-over switch to balance the gain of the channels.

5. A mixing circuit according to the claim 1 wherein the first channel comprises a change-over/sampler circuit consisting of a sample/hold circuit followed by a multiplier circuit, the said multiplier circuit producing a multiplication by +1 during a half cycle of each dot cycle and by −1 during the following half cycle, the second channel also comprising an adder circuit fed with the two signals to produce the corresponding sum.

6. A mixing circuit according to the claim 1 wherein the filter circuit is a high-pass circuit of the RC cell type.

7. A mixing circuit according to the claim 1 wherein the filter circuit is of the pass-band type to select a demarcated HF spectrum and comprises an RLC cell.

* * * * *